（12）United States Patent
Tsuzuki

(10) Patent No.: US 7,038,859 B2
(45) Date of Patent: May 2, 2006

(54) LENS BARREL AND IMAGING DEVICE

(75) Inventor: Masahiko Tsuzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/970,926

(22) Filed: Oct. 21, 2004

(65) Prior Publication Data

US 2005/0088757 A1   Apr. 28, 2005

(30) Foreign Application Priority Data

Oct. 27, 2003  (JP) ............................. 2003-365933
Sep. 17, 2004  (JP) ............................. 2004-271470

(51) Int. Cl.
*G02B 15/14*  (2006.01)
*G02B 7/02*   (2006.01)

(52) U.S. Cl. ..................... 359/704; 359/703; 359/699; 359/700; 359/819; 359/826

(58) Field of Classification Search ................ 359/704, 359/703, 701, 700, 799, 694, 699, 819, 826, 359/821, 822
See application file for complete search history.

(56) References Cited

U.S. PATENT DOCUMENTS 6,606,206 B1    8/2003  Takeshita et al.
6,835,006 B1 *  12/2004 Tanaka et al. ............... 396/349
2003/0002173 A1 * 1/2003 Koiwai et al. ............... 359/700

FOREIGN PATENT DOCUMENTS

JP   2001-324749   * 11/2001

* cited by examiner

*Primary Examiner*—Timothy Thompson
(74) *Attorney, Agent, or Firm*—Canon USA, Inc.

(57) ABSTRACT

A lens barrel includes a fixed cylinder fixed to an imaging device body, a lens-holding frame, and a movable cylinder for supporting the lens-holding frame movably in an optical axial direction, in which the movable cylinder is located at a position collapsed relative to the fixed cylinder in a non-imaging mode while the movable cylinder is extended from the collapsed position to a zooming region in an imaging mode, and then the movable cylinder moves in the optical axial direction within the zooming region.

7 Claims, 6 Drawing Sheets

LENS BARREL AND IMAGING DEVICE

This application claims priority from Japanese Patent Application Nos. 2003-365933 filed Oct. 27, 2003 and 2004-271470 filed Sep. 17, 2004, which are hereby incorporated by reference herein.

BACKGROUND OF THE INVENTION

1. Field of the Invention

The present invention relates to a zoom lens barrel and an optical instrument using the barrel, such as a still camera, a digital still camera, and a video camera.

2. Description of the Related Art

In an imaging device such as a digital camera, a so-called collapsible lens barrel has been used in that during imaging, a lens barrel is extended from an imaging device body while during carrying (non-imaging), the lens barrel is accommodated into the imaging device body.

Such a lens barrel is disclosed in Japanese Patent Laid-Open No. 2001-324663, in which a movable cam ring is provided with a cam groove for moving a lens; a fixed cylinder is provided with a collapsing cam groove; and the movable cam ring is rotated along the collapsing cam groove of the fixed cylinder so as to move the movable cam ring in an optical axial direction, shifting the state from collapsing to imaging. At this position in the imaging state, by rotating the movable cam ring without moving it in the optical axial direction, a movable lens is moved in the optical axial direction along the cam groove for moving the lens so as to perform zooming.

Recently, for imaging devices, such as digital cameras, the miniaturization in size and thickness has been demanded, so that in a structure in that a lens barrel is accommodated (collapsed) within an imaging device body, reduction in the entire length of the lens barrel in an accommodated (collapsed) state is required.

In the lens barrel disclosed in Japanese Patent Laid-Open No. 2001-324663 mentioned above, since zooming is performed in an imaging mode, by rotating a movable cam-ring without moving it in the optical axial direction so as to move a movable lens in the optical axial direction along a cam groove for moving a lens, the cam groove for moving a lens is necessary to be formed corresponding to the displacement (zooming amount), so that in accordance with this displacement, the entire length of the movable cam-ring in the optical axial direction is required to be long. Thus, the entire length of the lens barrel is increased in a collapsed state in that the lens barrel is accommodated within the imaging device body. Also, in an optical system in that the movable lens at the wide end is different in position from that at the telescopic end, in the zooming region along the optical axis (the extended displacement of the movable lens at the wide end is different from that at the telescopic end), the length of the cam groove for moving a lens is further increased, so that the entire length of the movable cam-ring in the optical axial direction is further elongated. Also, because of steep changes in cam profile, the torque for rotating the movable cam-ring is increased.

SUMMARY OF THE INVENTION

It is an object of the present invention to provide a lens barrel with an entire length reduced in an optical axial direction by reducing the entire length of a movable cam-ring (movable cylinder) in the optical axial direction.

In order to achieve the above object, a lens barrel includes a fixed cylinder fixed to an imaging device body, a lens-holding frame, and a movable cylinder for supporting the lens-holding frame movably in an optical axial direction, wherein the movable cylinder is located at a position collapsed relative to the fixed cylinder in a non-imaging mode, the movable cylinder is extended from the collapsed position to a zooming region in an imaging mode and then the movable cylinder moves in the optical axial direction within the zooming region.

The lens barrel according to the present invention is for use in imaging devices, such as a cameras.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and together with the description, serve to explain the principles of the invention.

DESCRIPTION OF THE PREFERRED EMBODIMENTS

Embodiments according to the present invention will be described below with reference to the drawings.

Figure 1:
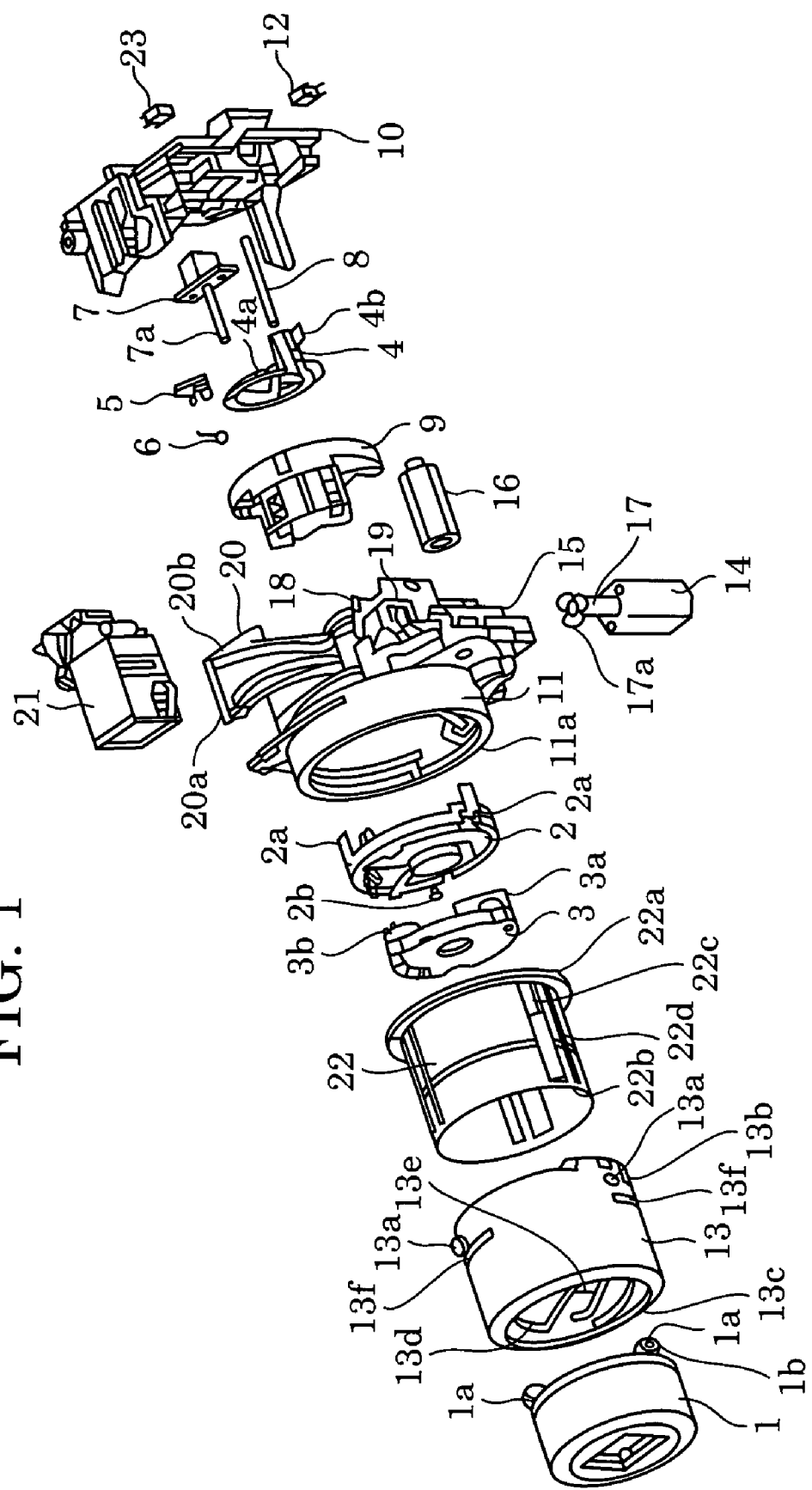
FIG. 1 is an exploded perspective view a lens barrel according to an embodiment of the present invention.
Figure 2:
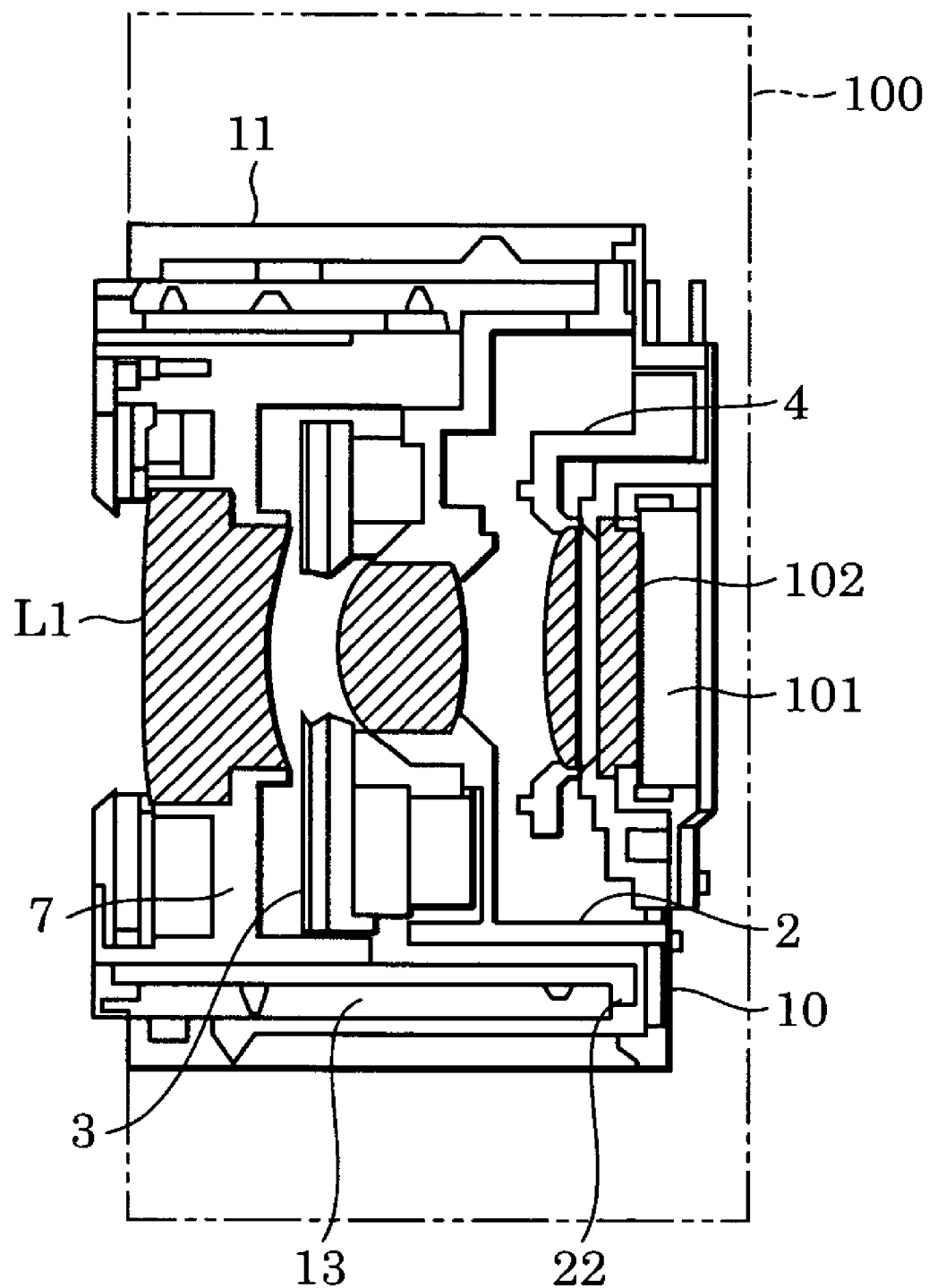
FIG. 2 is a sectional view showing a collapsed state of the lens barrel according to the embodiment.
Figure 3:
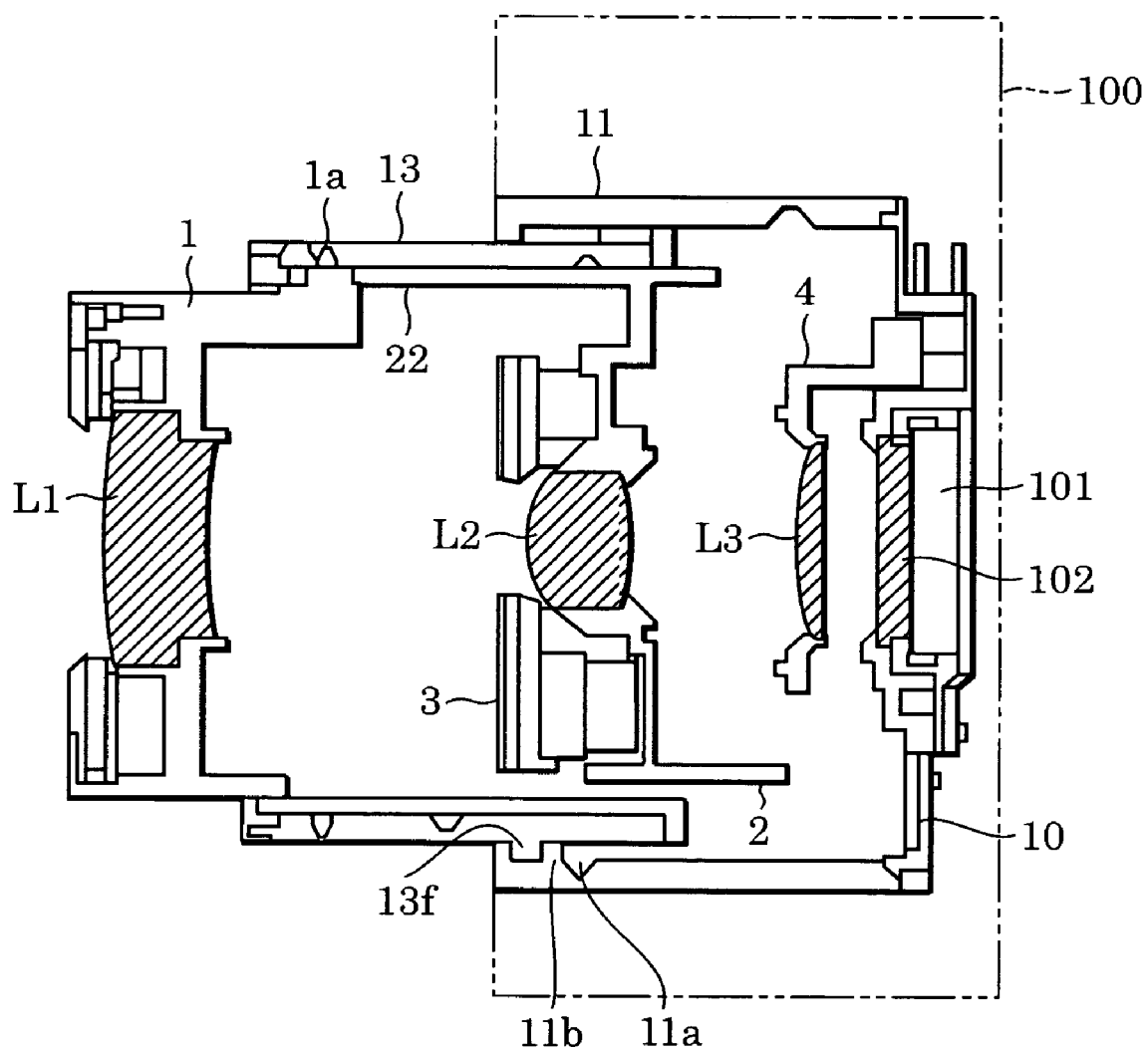
FIG. 3 is a sectional view showing a wide state of the lens barrel according to the embodiment.
Figure 4:
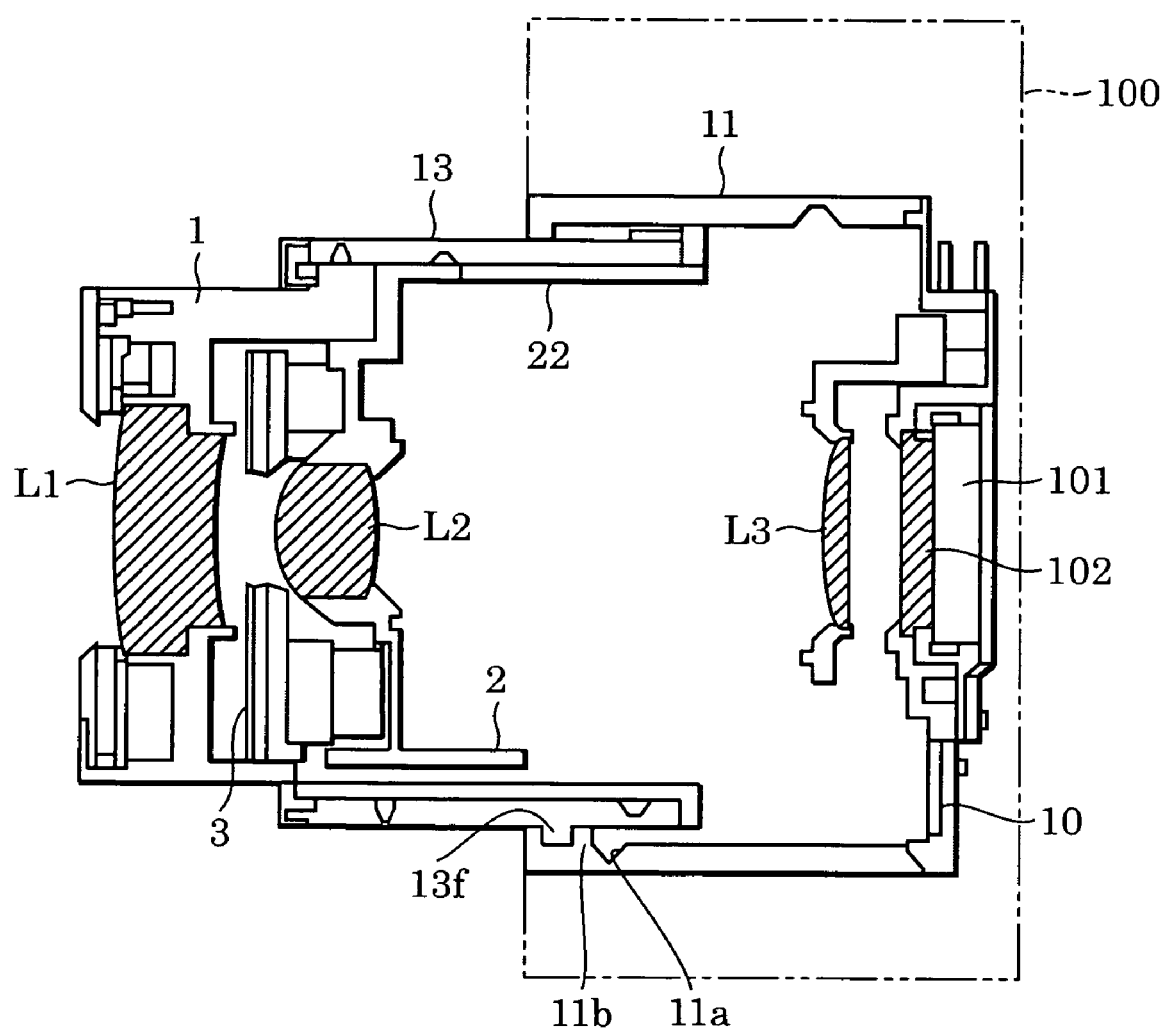
FIG. 4 is a sectional view showing a telescopic state of the lens barrel according to the embodiment.

FIG. 1 is an exploded perspective view of a lens barrel of an imaging device (a digital camera or a video camera) incorporating the present invention; FIGS. 2 to 4 are sectional views of the lens barrel, in which FIG. 2 shows a collapsed state, FIG. 3 shows a wide-angle state, and FIG. 4 shows a telescopic state.

In these drawings, a zoom optical system in a lens barrel according to the present invention is a rear focus forming unit of three-group concave-convex-convex. A first-group movable lens unit L1 is held by a first holding frame (lens holding frame) 1 having three bosses 1*b* formed on the external side face. A follower pin 1*a* with a tapered portion is press-fitted into each boss 1*b*. A second-group movable lens unit L2 is held by a second holding frame (lens holding frame) 2. The second holding frame 2 is provided with two followers 2*a* integrally formed with a tapered portion formed on the external side face, and one movable follower 2*b* arranged movably toward the optical axial center. These three followers are arranged on the external periphery of the second holding frame 2 at equal intervals. The movable follower 2*b* is urged by a compression spring (not shown), thereby maintaining the accuracy in the mechanical space with pushing on one-side.

A diaphragm unit 3 is fixed to a second holding frame 2, and separately includes a diaphragm drive unit 3*a* and a shutter drive unit 3b. The diaphragm drive unit 3a drives a plurality of diaphragm blades so as to change the shape of a diaphragm opening. The shutter drive unit 3b drives two rotary blades so as to operate a shutter from the fully open state to the fully closed state.

A third holding frame 4 is for holding a third-group movable lens unit L3, and is guided by a guide shaft (not shown) integrally arranged in a guide bar 8 and a cover 9. The third holding frame 4 is positioned by an arm 4a of the third holding frame 4 in the optical axial direction, and is restricted by a rotatably attached rack member 5. A stepping motor 7 drives an output screw 7a. The stepping motor 7 is fixed to the cover 9 with screws. The end of the output screw 7a is journaled by a bearing portion (not shown) integrally formed on the cover 9. The rack member 5 is pushed in contact on the output screw 7a of the stepping motor 7 by a force of a spring 6, and is driven in the optical axial direction by the rotation of the stepping motor 7. Thereby, the third holding frame 4 is moved in the optical axial direction.

A CCD holder 10 is a base portion of the lens-barrel unit and is constituting the structure of the lens barrel unit together with a fixed lens-barrel 11 fixed to the front end of the CCD holder 10 with screws (not shown). The cover 9 is fixed to the CCD holder 10 with screws (not shown). A photo-interrupter 12 is fixed to the CCD holder 10, and a slit-plate portion 4b integrally formed in the third holding frame 4 is arranged at a movable position of a slit portion of the photo-interrupter 12. The CCD holder 10 is provided with an imaging element 101, such as a CCD and a CMOS (complementary metal oxide semiconductor), and a low-pass filter 102 fixed thereto. Referring to FIG. 2, the fixed lens-barrel 11 is fixed to an imaging device body (optical instrument) 100, such as a digital camera and a video camera.

On the inner surface of the fixed lens-barrel 11 (fixed cylinder), a cam groove 11a is formed. A metallic follower pin (first follower pin) 13a, which is pushed into and fixed to a movable cam-ring 13 (movable cylinder), is fitted (engaged) with the cam groove 11a. By the rotation of the movable cam-ring 13 along the cam groove (first cam-ring) 11a, the movable cam-ring 13 is extended in the optical axial direction. With a cam lift (cam inclination) of the cam groove 11a, the movable cam-ring 13 is moved in the optical axial direction along a collapsing region and a zooming region for imaging.

The fixed lens-barrel 11 is provided with a zoom motor 14, a gear 17 attached to the output shaft of the zoom motor 14, a gear train 15 for reducing the output of the zoom motor 14, and an output gear 16, which are assembled therein. By transmitting the rotation of the zoom motor 14 to gear teeth 13b formed on the periphery of the movable cam-ring 13 via the gear train 15 and the output gear 16, the movable cam-ring 13 is rotationally driven to move in the optical axial direction. The gear 17 is provided with three blades 17a for detecting the rotation of the zoom motor 14. Photo-interrupters 18 and 19 are arranged at an angle of 150° so that the blades 17a block off slits.

A finder cam plate 20 is provided with tapered cam grooves 20a and 20b formed on the surface for zoom-driving a finder lens of a finder unit 21. The finder cam plate 20 is rotatable along the external periphery of the fixed lens-barrel 11 so as to zoom by linking to the movable cam-ring 13. A straight guide cylinder 22 is rotatably fitted inside the movable cam-ring 13. A projection 22a formed on the straight guide cylinder 22 is fitted into the cam groove 11a of the fixed lens-barrel 11 so as not to rotate the straight guide cylinder 22 about the fixed lens-barrel 11. Also, three projections 22b formed on the straight guide cylinder 22 are fitted into a groove 13c tangentially formed on the internal surface of the movable cam-ring 13. Thus, although the straight guide cylinder 22 and the movable cam-ring 13 are rotatable, they move integrally in the optical axial direction.

A metallic follower pin (second follower pin) 1a provided in the first holding frame 1 is fitted into (engaged with) a cam groove (second cam groove) 13d of the movable cam-ring 13 while a straight groove 22c of the straight guide cylinder 22 is fitted to the bosses 1b formed in the first holding frame 1. With the straight groove 22c, the first holding frame 1 is limited from rotating in the rotational direction, so that when the movable cam-ring 13 is rotated, the first holding frame 1 is moved (extended) in the optical axial direction. In the same way, the second holding frame 2 is also limited from rotating by the engagement between a cam groove (second cam groove) 13e of the movable cam-ring 13 and a straight groove 22d of the straight guide cylinder 22. Thus, when the movable cam-ring 13 is rotated, the second holding frame 2 is moved (extended) along the cam groove 13e in the optical axial direction.

Figure 5:
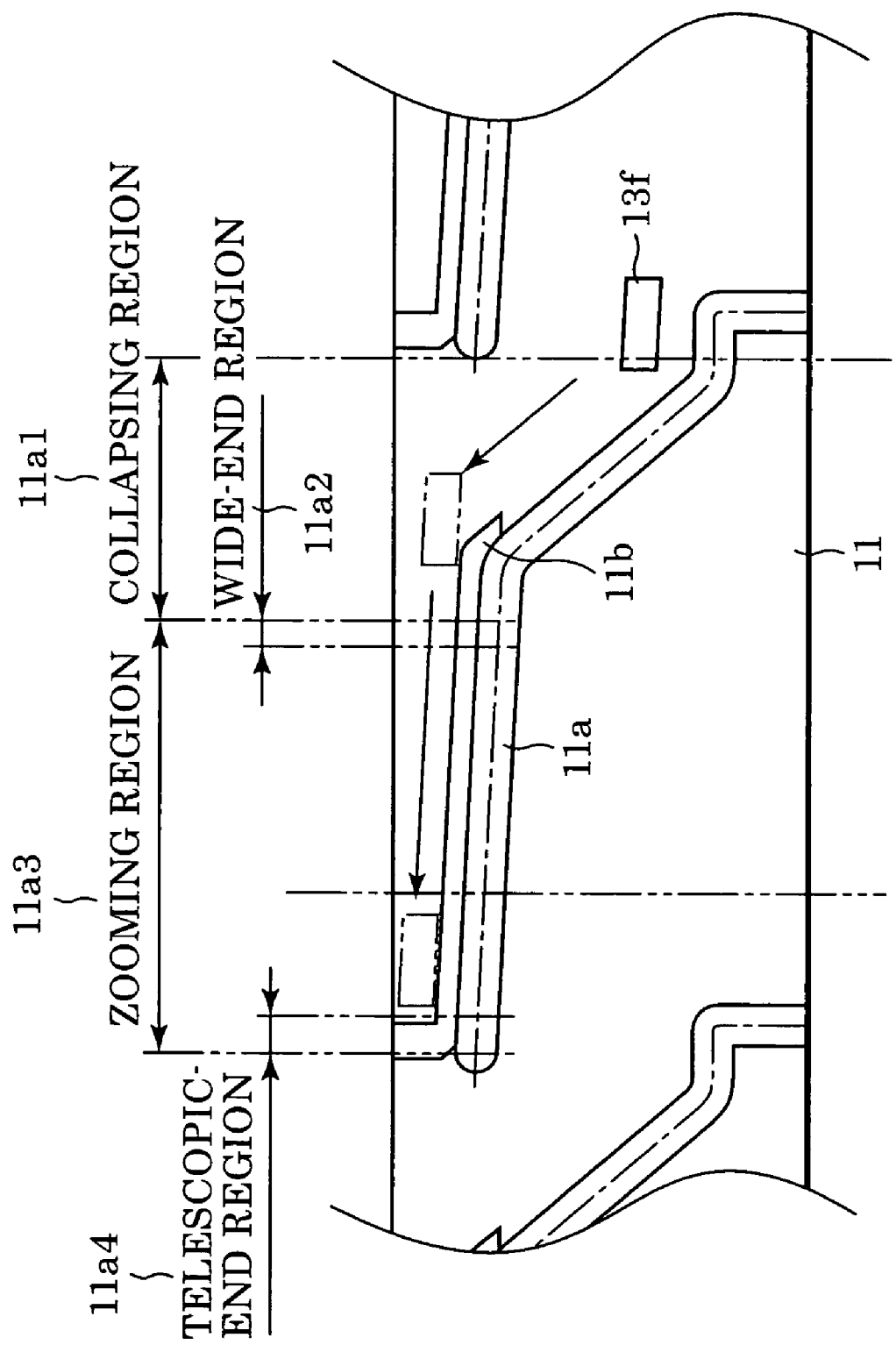
FIG. 5 is a development diagram of a fixed lens-barrel according to the embodiment.

FIG. 5 is a development diagram of the internal surface of the fixed lens-barrel 11, showing the relationship between a receiving portion (second projection) 11b formed along the cam groove 11a provided inside the fixed lens-barrel 11 and a flange (first projection) 13f formed in the external periphery of the movable cam-ring 13. The cam groove 11a of the fixed lens-barrel 11 includes a collapsing region 11a1 and a zooming region 11a3, and the zooming region 11a3 further includes a wide-end region 11a2 and a telescopic-end region 11a4.

During the follower pin 13a moves along the collapsing region 11a1 from the collapsing position (a position where the movable cylinder is collapsed relative to the fixed cylinder in the non-imaging mode) of the cam groove 11a of the fixed lens-barrel 11 until the wide-end region 11a2 by the rotation of the movable cam-ring 13 about the fixed lens-barrel 11, the flange 13f is positioned adjacent to an imaging surface (imaging device body) further than the receiving portion 11b provided in the fixed lens-barrel 11.

During the follower pin 13a moves along the zooming region 11a3 by the further rotation of the movable cam-ring 13 about the fixed lens-barrel 11, the cam groove 11a (between the wide-end region 11a2 and the telescopic-end region 11a4) and the receiving portion 11b are changed in an equal lead shape (the cam lift has equally linear shape). That is, the cam groove 11a and the receiving portion 11b are inclined to a surface normal to the optical axial direction oppositely to the imaging device body. The movable cam-ring 13 moves in the optical axial direction by a replacement proportional to the number of revolutions of the movable cam-ring 13. At this time, the flange 13f is positioned adjacent to an object (opposite to the imaging device body), and the flange 13f can be abutted to the receiving portion 11b.

As mentioned above, the cam groove 11a includes a first lift which moves the movable cam-ring 13 in the optical axial direction in the collapsing cam region 11a1 from the collapsing position to the imaging position (zooming region) and a second lift (equal-lead shape) which moves the movable cam-ring 13 in the optical axial direction in the zooming region from the wide-end region 11a2 to the telescopic-end region.

Thus, in an imageable state (zooming region), if an external impact is applied to the first holding frame 1 and the movable cam-ring 13, the flange 13f of the movable cam-ring 13 abuts the receiving portion 11b of the fixed lens-barrel 11 so that the receiving portion 11b absorbs the external pressure, preventing the follower pin 13a of the movable cam-ring 13 from coming off the cam groove 11a of the fixed lens-barrel 11.

The initial zooming position, as shown in FIG. 1, is detected by a douser (not shown) of the straight guide cylinder 22 shielding a photo-interrupter 23 fixed to the CCD holder 10 from light. The gear 17 is provided with three blades 17a for detecting the rotation of the zoom motor 14. The slits of the photo-interrupters 18 and 19 are excluded with the blades 17a so as to convert the rotation of the zoom motor 14 into a pulse waveform, so that the number of revolutions of the zoom motor 14 by counting the number of the pulse waveforms. The number of revolutions is standardized to have a home position using the initial zooming position mentioned above as a reference.

Figure 6:
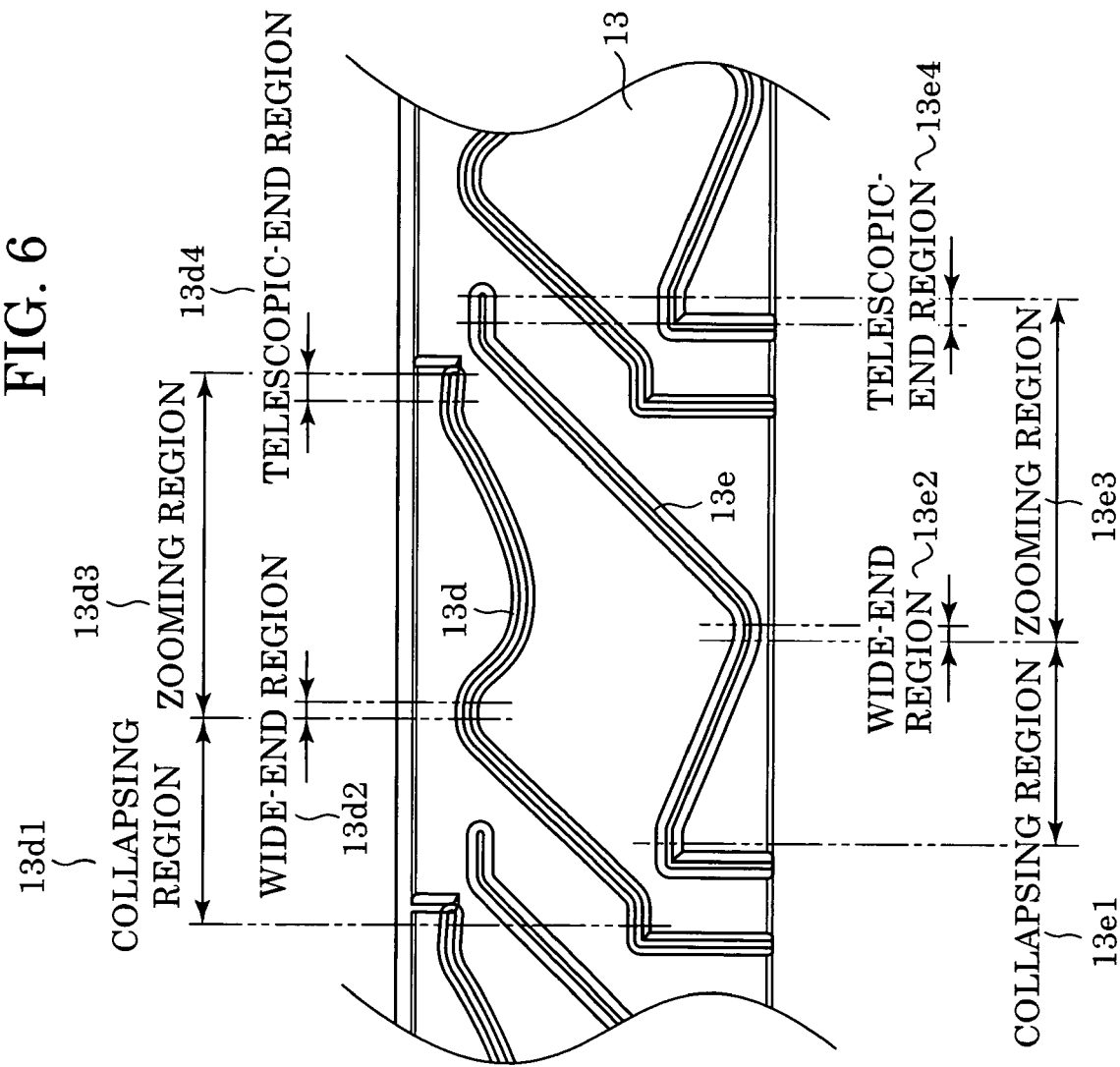
FIG. 6 is a development diagram of a movable cam-ring according to the embodiment.

FIG. 6 is a development diagram of the internal surface of the movable cam-ring 13. The movable cam-ring 13 is provided with a first-group cam groove 13d for moving the first holding frame 1 in the optical axial direction and a second-group cam groove 13e for moving the second holding frame 2 in the optical axial direction. The first-group cam groove 13d includes a collapsing region 13d1 and a zooming region 13d3, and the zooming region 13d3 further includes a wide-end region 13d2 and a telescopic-end region 13d4. Also, the second-group cam groove 13e includes a collapsing region 13e1 and a zooming region 13e3, and the zooming region 13e3 further includes a wide-end region 13e2 and a telescopic-end region 13e4.

In the wide-end region 13d2 of the first-group cam groove 13d and in the wide-end region 13e2 of the second-group cam groove 13e, the cam lift is shaped in an equal lead shape directed oppositely to that of the wide-end region 11a2 of the cam groove 11a of the fixed lens-barrel 11. That is, the first holding frame 1 and the second holding frame 2 move in a direction opposite to that of the movable cam-ring 13 by the same displacement as that of the movable cam-ring 13. Within this range, the first holding frame 1 and the second holding frame 2 are maintained in a constant position (wide-end position), in which they do not move relative to the fixed lens-barrel 11 in the optical axial direction.

Also, in the telescopic-end cam region 13d4 of the first-group cam groove 13d and in the telescopic-end cam region 13e4 of the second-group cam groove 13e, the cam lift is shaped in an equal lead shape directed oppositely to that of the telescopic-end region 11a4 of the cam groove 11a of the fixed lens-barrel 11. That is, the first holding frame 1 and the second holding frame 2 move in a direction opposite to that of the movable cam-ring 13 by the same displacement as that of the movable cam-ring 13. Within this range, the first holding frame 1 and the second holding frame 2 are maintained in a constant position (telescopic-end position), in which they do not move relative to the fixed lens-barrel 11 in the optical axial direction.

The step deviation from the initial zooming position (difference from the designed value) is absorbed with this range (the range, within which the first holding frame 1 and the second holding frame 2 are held at the telescopic-end position and at the wide-end position, where they do not move relative to the fixed lens-barrel 11 in the optical axial direction) so as to precisely establish the telescopic-end position and the wide-end position within the zooming region.

The cam groove 11a in the imageable range (zooming region) of the fixed lens-barrel 11 is formed in the equal lead shape as mentioned above. Since the cam lifts of the first-group cam groove 13d and the second-group cam groove 13e in the zooming region (including transition points) can be applied to the equal lead shape of the cam groove 11a of the fixed lens-barrel 11, the cam lift of the movable cam-ring 13 can be designed to gradually incline. Hence, the entire length of the movable cam-ring 13 in the optical axial direction can be reduced, so that the entire length of the lens barrel in the optical axial direction in the collapsed state can be reduced.

As described above, according to the embodiment, by forming the cam on the external surface of the fixed lens-barrel in the imageable range (zooming region) in an equal lead shape, the cam profile of the movable cam-ring is gradually changed. Moreover, if optical axial positions of the lens holding frame at the wide-end position and at the telescopic-end position within the zooming region differ from each other, the cam lift of the movable cam-ring may be subtracted by the cam lift of the fixed lens barrel, so that the entire length of the lens barrel in the collapsed state can be reduced.

Also, by forming the cam on the external surface of the fixed lens-barrel in the imageable range in an equal lead shape, as well as by providing the receiving portion (second projection) on the internal surface of the fixed lens barrel along the cam and providing a flange (first projection), which can be abutted to the receiving portion, in the movable cam-ring in the imageable range adjacent to an object, if an external impact is applied to the lens barrel, the follower of the movable cam-ring is effectively prevented from coming off the cam groove of the fixed lens-barrel, enabling the zooming function to be prevented from being damaged.

Furthermore, at the wide and telescopic ends in the imageable range of the movable cam-ring, by forming the cam on the external surface of the movable cam-ring in an equal lead shape that cancels the cam lift of the fixed lens-barrel, a region, where optical axial positions of the first-group movable lens unit and the second-group movable lens unit are not changed at the wide and telescopic ends, can be created so as to precisely establish the wide and telescopic end positions for zooming by correcting the zooming positional deviation.

According to the embodiment, the cam in the imageable range of the fixed lens-barrel for moving the movable cam-ring in the optical axial direction is formed in an equal lead shape, while the wide-end region and the telescopic-end region of the movable cam-ring are formed in an equal lead shape with a cam shift opposite to the above equal lead shape, so that the first-group movable lens unit and the second-group movable lens unit are retained (not moved) at the wide and telescopic ends; however, the shape of each cam of the fixed lens-barrel and the movable cam-ring is not limited to the equal lead shape, so that it may be a shape with a varying cam lift or a non-linear shape as long as in the wide side and the telescopic side of the imageable range (zooming region), the movable lens retains (not moved from) the wide and telescopic ends.

According to the present invention, by reducing the entire length of the movable cam-ring (movable cylinder) in the optical axial direction, a lens barrel with a reduced entire length in the optical axial direction can be provided.

As many apparently widely different embodiments of the present invention can be made without departing from the sprit and scope thereof, it is to be understood that the invention is not limited to the specific embodiments thereof except as defined in the claims.

What is claimed is:

1. A lens barrel comprising:

a fixed cylinder fixed to an imaging device body;

a lens-holding frame; and a movable cylinder for supporting the lens-holding frame movably in an optical axial direction, wherein the movable cylinder is located at a position collapsed relative to the fixed cylinder in a non-imaging mode, the movable cylinder is extended from the collapsed position to a zooming region in an imaging mode and then the movable cylinder moves in the optical axial direction within the zooming region, wherein when the movable cylinder moves within a wide-end region or a telescopic-end region within the zooming region, the lens-holding frame moves in a direction opposite to the movement of the movable cylinder by the same displacement as that of the movable cylinder.

2. The lens barrel according to claim 1, wherein the movable cylinder moves in the optical axial direction within the zooming region by the movable cylinder rotating about the fixed cylinder, and wherein a moving distance of the movable cylinder is proportional to a rotating number of the movable cylinder.

3. The lens barrel according to claim 1, wherein the fixed cylinder comprises a first cam groove to be brought into engagement with a first follower pin provided in the movable cylinder.

4. The lens barrel according to claim 3, wherein the first cam groove located within the zooming region is inclined relative to a plane normal to the optical axial direction and oppositely to the imaging device body.

5. The lens barrel according to claim 3, wherein the fixed cylinder comprises a second projection that abuts a first projection provided in the movable cylinder, and the second projection is formed along the first cam groove.

6. The lens barrel according to claim 1, wherein the movable cylinder comprises a second cam groove to be brought into engagement with a second follower pin provided in the lens-holding frame.

7. An imaging device comprising the lens barrel according to claim 1.

* * * * *